US008795476B2

(12) United States Patent
Flottvik

(10) Patent No.: US 8,795,476 B2
(45) Date of Patent: Aug. 5, 2014

(54) CHARCOAL REACTOR SYSTEM

(76) Inventor: John Flottvik, Merritt (CA)

(*) Notice: Subject to any disclaimer, the term of this patent is extended or adjusted under 35 U.S.C. 154(b) by 961 days.

(21) Appl. No.: 12/890,158

(22) Filed: Sep. 24, 2010

(65) Prior Publication Data

US 2012/0073949 A1 Mar. 29, 2012

(51) Int. Cl.
*C10B 33/02* (2006.01)
*C10B 1/06* (2006.01)
*C10L 5/40* (2006.01)

(52) U.S. Cl.
USPC ............ 202/118; 202/226; 202/262; 44/599; 44/607

(58) Field of Classification Search
USPC ............... 202/117, 118, 217, 226, 262, 270; 201/1, 16, 22; 44/509, 591, 599, 607, 44/629; 423/445 R
See application file for complete search history.

(56) References Cited

U.S. PATENT DOCUMENTS

| | | | | |
|---|---|---|---|---|
| 3,475,279 A | * | 10/1969 | Bowman | 201/32 |
| 3,945,890 A | * | 3/1976 | Kemp | 202/84 |
| 4,052,265 A | * | 10/1977 | Kemp | 201/2.5 |
| 4,123,332 A | * | 10/1978 | Rotter | 201/15 |
| 4,308,103 A | * | 12/1981 | Rotter | 202/117 |
| 4,908,104 A | * | 3/1990 | Loomans et al. | 201/25 |
| 5,151,159 A | * | 9/1992 | Wolfe et al. | 202/118 |
| 5,207,176 A | * | 5/1993 | Morhard et al. | 110/246 |
| 5,296,005 A | * | 3/1994 | Wolfe et al. | 44/551 |
| 5,411,714 A | * | 5/1995 | Wu et al. | 422/232 |
| 6,039,774 A | * | 3/2000 | McMullen et al. | 48/102 A |
| 7,641,770 B2 | * | 1/2010 | Cauley et al. | 202/100 |
| 7,749,359 B2 | * | 7/2010 | Flottvik | 202/118 |
| 8,419,901 B2 | * | 4/2013 | Flottvik | 201/25 |
| 8,475,564 B2 | * | 7/2013 | Valente | 95/11 |
| 8,545,679 B2 | * | 10/2013 | Cauley et al. | 202/100 |
| 2002/0117388 A1 | * | 8/2002 | Denison | 201/25 |
| 2007/0209923 A1 | * | 9/2007 | Flottvik | 202/118 |
| 2008/0128259 A1 | * | 6/2008 | Kostek et al. | 201/4 |

FOREIGN PATENT DOCUMENTS

| | | | | |
|---|---|---|---|---|
| CA | 2242279 | | 2/2000 | |
| JP | 02194349 A | * | 7/1990 | G01N 5/00 |

* cited by examiner

*Primary Examiner* — Nina Bhat
*Assistant Examiner* — Jonathan Miller
(74) *Attorney, Agent, or Firm* — Oyen Wiggs Green & Mutala LLP

(57) ABSTRACT

A reactor for converting organic feed is provided. A retort extends through the furnace of the reactor. The retort has a retort auger, an inlet and an outlet. The reactor includes a charcoal delivery assembly having a collection line, delivery line, and a transfer zone. The collection line is adjacent to the outlet of the retort receives charcoal from the retort, and contains a collection auger with a flighted portion extending at least partially therethrough. The delivery line is connected to a downstream portion of the collection line and has a flighted delivery auger extending therethrough. The transfer zone is a space, between a downstream end of the flighted portion of the collection auger and an upstream end of the flighted delivery auger, where charcoal collected and delivered by the collection auger forms a plug, thereby blocking biogas from the retort from entering the delivery line.

10 Claims, 10 Drawing Sheets

CHARCOAL REACTOR SYSTEM

FIELD OF THE INVENTION

This invention relates to systems and methods for continuous production of charcoal and biogas by pyrolysis of organic feed.

BACKGROUND OF THE INVENTION

Systems and methods for producing charcoal in a continuous manner by moving organic feed through retorts are known. For example, Canadian Patent No. 2,242,279 discloses an apparatus for continuous charcoal production comprising a heated tubular retort with a screw element extending through the retort.

Several problems exist with prior systems. The moisture content of organic feed fed into the retorts is often higher than desired. Heating and cooling of the system causes thermal dimensional changes of metal components that cause strain at connections between the retort auger and the motor driving the retort auger, and at the connections between parts of the manifold used to vent biogas from the retorts. Biogas is often channelled to the charcoal storage bin, resulting in an explosion hazard. Biogas produced by the system may not be sufficiently "dried" to provide syngas useful as fuel. There is a need for systems and methods that address at least some of these problems.

SUMMARY OF THE INVENTION

This invention provides improved systems and methods for continuous production of charcoal and biogas by pyrolysis of organic feed.

The following aspects of the invention are described and illustrated in conjunction with systems and methods which are meant to be exemplary and illustrative, not limiting in scope.

According to one aspect of the invention, a reactor is provided for converting organic feed. The reactor has a furnace and a retort extending through the furnace. The retort has a retort auger, an inlet and an outlet. The reactor further includes a charcoal delivery assembly having a collection line, delivery line, and a transfer zone. The collection line is adjacent to the outlet of the retort for receiving charcoal from the retort and includes a collection auger extending at least partially therethrough. The collection auger comprising a flighted portion. The delivery line is connected to the collection line at a downstream portion of the collection line and has a flighted delivery auger extending therethrough. The transfer zone is defined by a space between a downstream end of the flighted portion of the collection auger and an upstream end of the flighted delivery auger. Charcoal collected and delivered by the collection auger forms a plug at the transfer zone for blocking biogas from the retort from entering the delivery line.

According to another aspect of the invention, a system for collecting charcoal from a retort is provided. The system has a collection line, delivery line, and a transfer zone. The collection line is adjacent to the outlet of the retort for receiving charcoal from the retort and includes a collection auger extending at least partially therethrough. The collection auger comprising a flighted portion. The delivery line is connected to the collection line at a downstream portion of the collection line and has a flighted delivery auger extending therethrough. The transfer zone is defined by a space between a downstream end of the flighted portion of the collection auger and an upstream end of the flighted delivery auger. Charcoal collected and delivered by the collection auger forms a plug at the transfer zone for blocking biogas from the retort from entering the delivery line.

According to a further aspect of the invention, a system for feeding organic feed to a retort is provided. The system includes:
(a) a feedline having an upstream end and a downstream end, the downstream end adjacent to an inlet of the retort;
(b) a cyclone having a feed intake, a return inlet, and an outlet;
(c) a first bin having an outlet adjacent to the upstream end of the feedline;
(d) a second bin having an outlet;
(e) a dryer having:
  (i) an inlet connected to the outlet of the second bin; and
  (ii) an outlet connected to the return inlet of the cyclone The outlet of the cyclone has a moisture sensor valve configurable between a first position when moisture content of incoming organic feed is below a predetermined threshold and a second position when the moisture content is at or above a predetermined threshold. The first position the moisture sensor valve directs the organic feed into the first bin, and in the second position the moisture valve directs the organic feed into the second bin.

According to another aspect of the invention, a reactor for converting organic feed to charcoal is provided. The reactor has a furnace and a retort extending through the furnace. The furnace has an exhaust stack located above an upstream end of the portion of the retort contained within the furnace so that combustion gases from the furnace flow toward the exhaust stack, providing additional heating to the upstream end of the portion of the retort contained within the furnace.

According to a further aspect of the invention, a reactor for converting organic feed to charcoal is provided. The reactor includes:
(a) a furnace;
(b) a retort extending through the furnace, the retort having a retort auger extending therethrough; and
(b) a motor for driving rotation of the retort auger, the motor fixed to the retort.

According to another aspect of the invention, a reactor for converting organic feed to charcoal is provided. The reactor includes:
(a) a furnace;
(b) a retort extending through the furnace;
(c) one or more first gas vents for venting gas from the retort; and
(d) a second gas vent in fluid communication with the one or more first gas vents, the second gas vent in axial alignment with the retort;

The second gas vent inclines in relation to the retort from a lower upstream position to a higher downstream position.

According to a further aspect of the invention, a method for converting organic feed to charcoal and collecting the charcoal is provided. The method includes the steps of:
(a) introducing the organic feed into an interior of a retort in a furnace;
(b) advancing the organic feed through the interior of the retort by rotating a retort auger extending therethrough,
(c) collecting the charcoal from the retort into an interior of a collection line;
(d) advancing the charcoal through the interior of the collection line by rotating a collection auger extending therethrough, the collection auger comprising a flighted portion extending at least a partial length of the collection auger;

(e) allowing a charcoal plug to continually form at a transfer zone defined by a space adjacent a downstream end of the flighted portion of the collection auger to block flow of biogas from the retort;

(f) continually transferring charcoal from the charcoal plug formed at the transfer zone to an interior of a delivery line; and (g) advancing the charcoal through the interior of the delivery line by rotating a delivery auger extending therethrough.

In addition to the exemplary aspects described above, further aspects and embodiments will become apparent by reference to the drawings and the following detailed description.

BRIEF DESCRIPTION OF THE DRAWINGS

In drawings which illustrate non-limiting specific embodiments of the invention.

DETAILED DESCRIPTION

Figure 1:
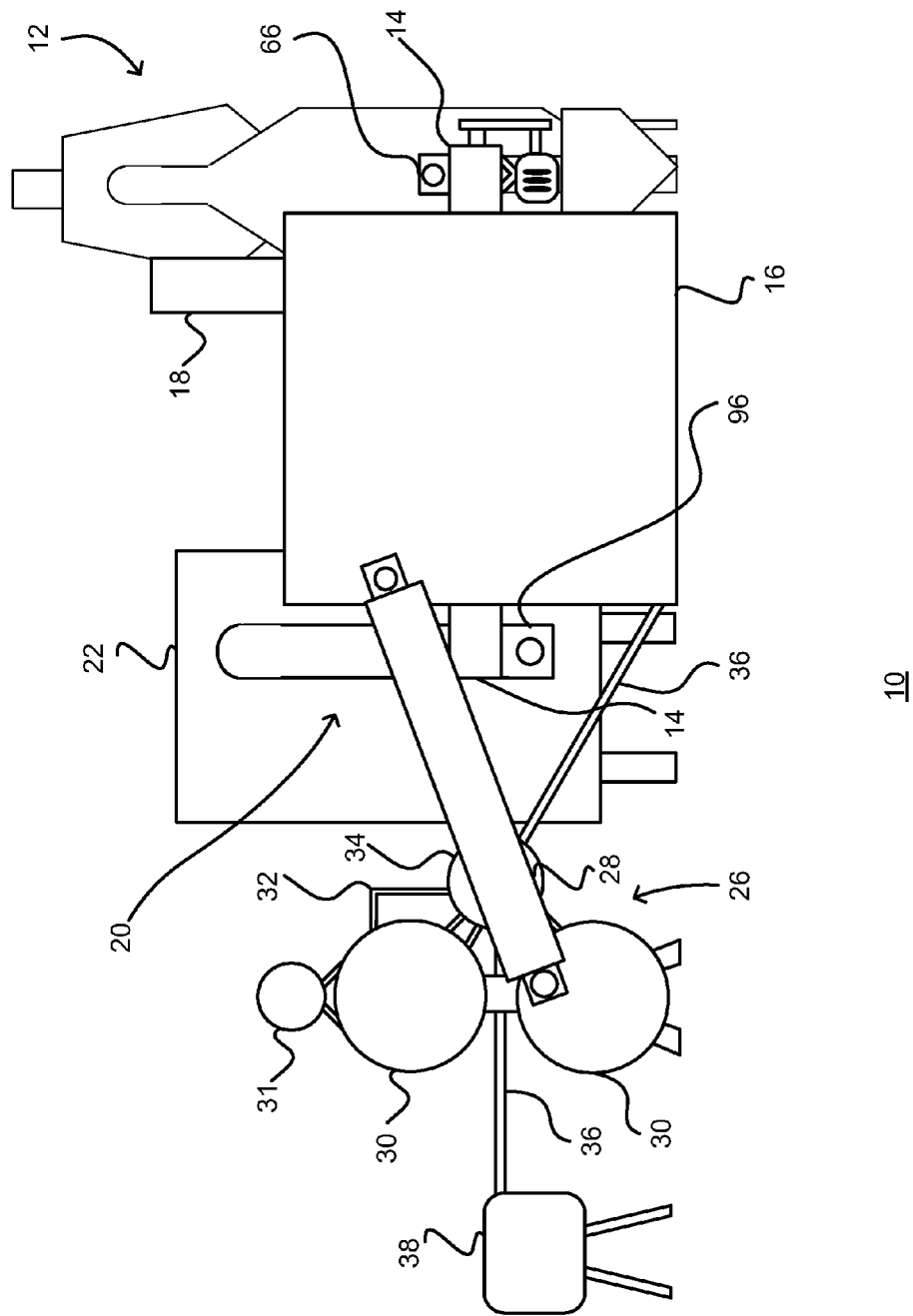
FIG. 1 is a schematic side view of a charcoal reactor system according to one embodiment of the invention.
Figure 2:
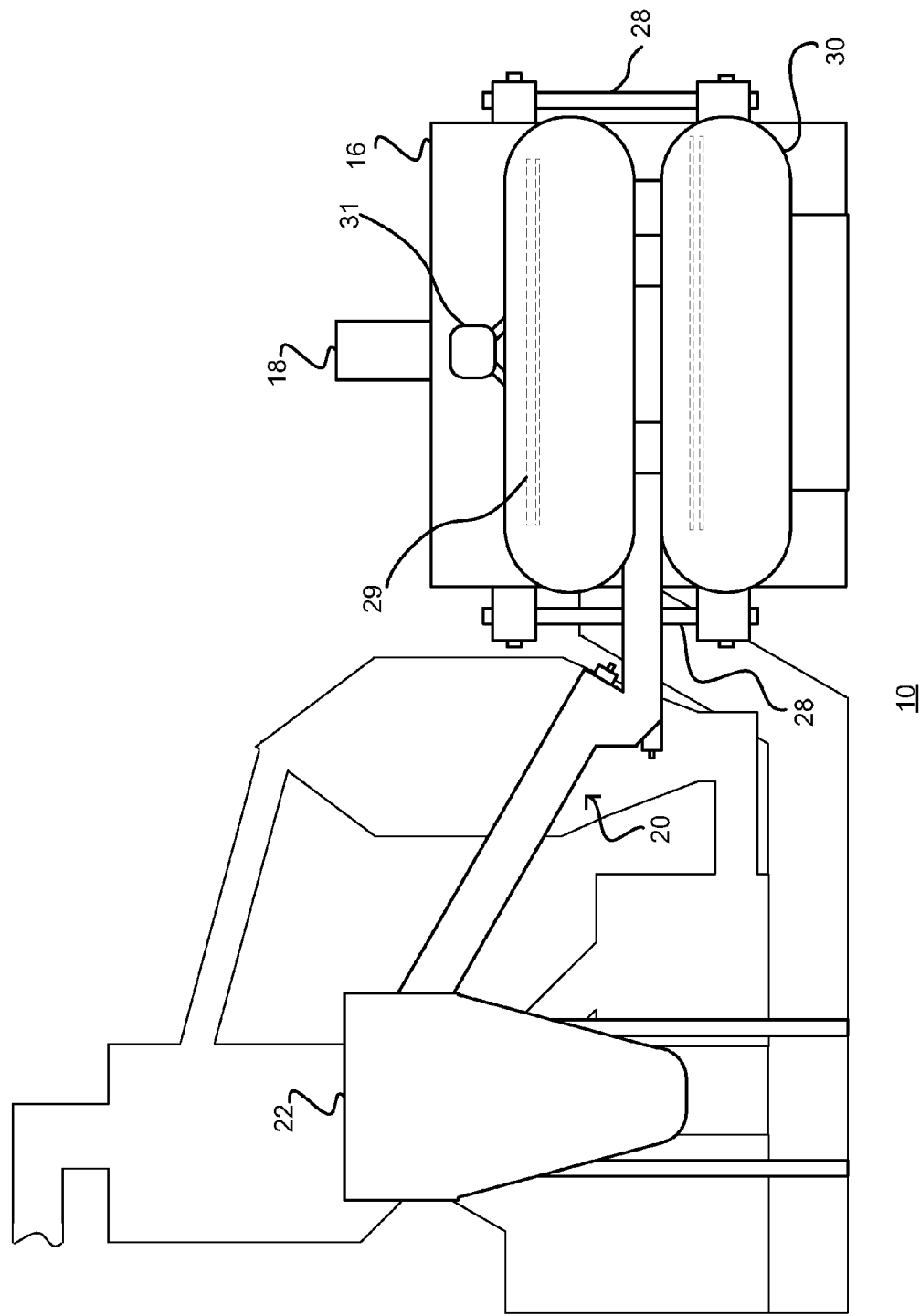
FIG. 2 is a partial cutaway schematic rear view of the charcoal reactor system of FIG. 1.
Figure 3:
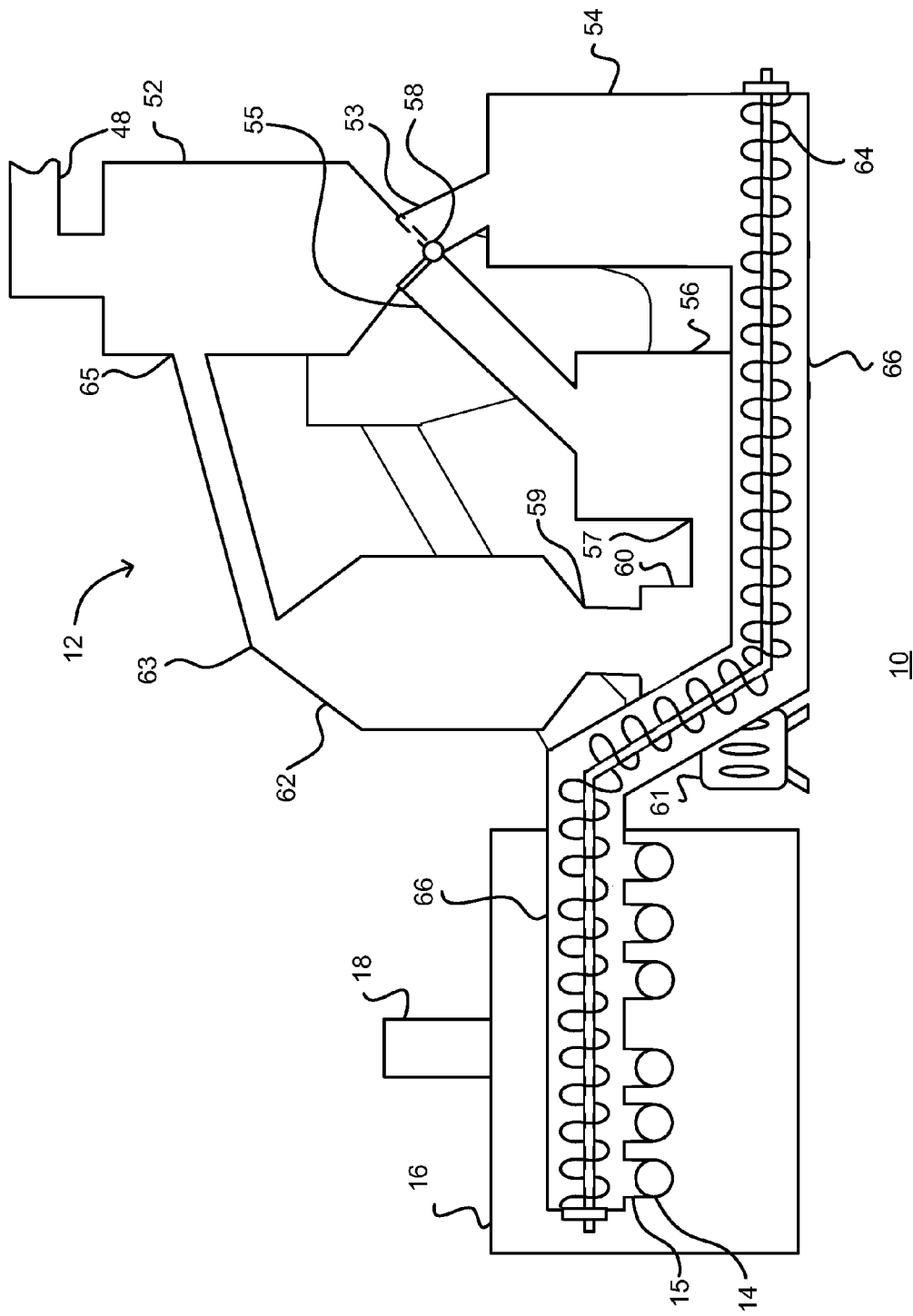
FIG. 3 is a partial cutaway schematic front view of the charcoal reactor system of FIG. 1.
Figure 4:
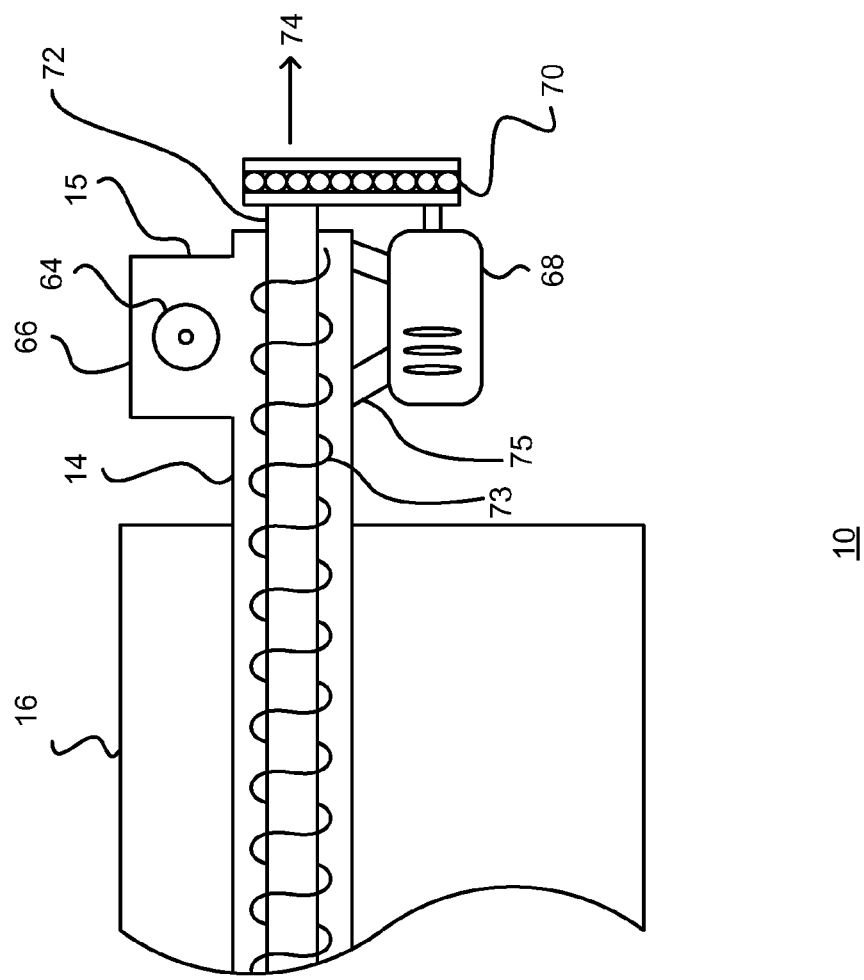
FIG. 4 is a partial side view of the charcoal reactor system of FIG. 1.

FIGS. 1, 2 and 3 illustrate an overall side, rear and front view, respectively, of a charcoal reactor system 10 according to one embodiment of the invention. For clarity, FIG. 2 shows the rear view of system 10 from the left hand side of system 10 as illustrated in FIG. 1. Feed assembly 12 loads dry organic feed via feed line 66 into one or more anaerobic retorts 14. Organic feed may be wood waste, agricultural waste, or any other organic material that can be burned to produce heat energy. Sawdust is one example of organic feed. Retorts 14 are tubular and extend through furnace 16. The walls of furnace 16 may be provided with 4" thick refractory. The organic feed is advanced through retorts 14 by retort augers 73 (FIG. 4). Heat from furnace 16 and the anaerobic conditions in retorts 14 pyrolize the organic feed advancing through retorts 14, converting the organic feed to charcoal and biogas.

Exhaust gases from combustion of fuel used to heat furnace 16 are released at exhaust stack 18 at the top of furnace 16. Exhaust stack 18 is located at the upstream end of furnace 16, directing the exhaust gases to provide additional heat for what would otherwise be a relatively cooler portion of furnace 16 due to incoming organic feed from outside furnace 16.

Figure 5:
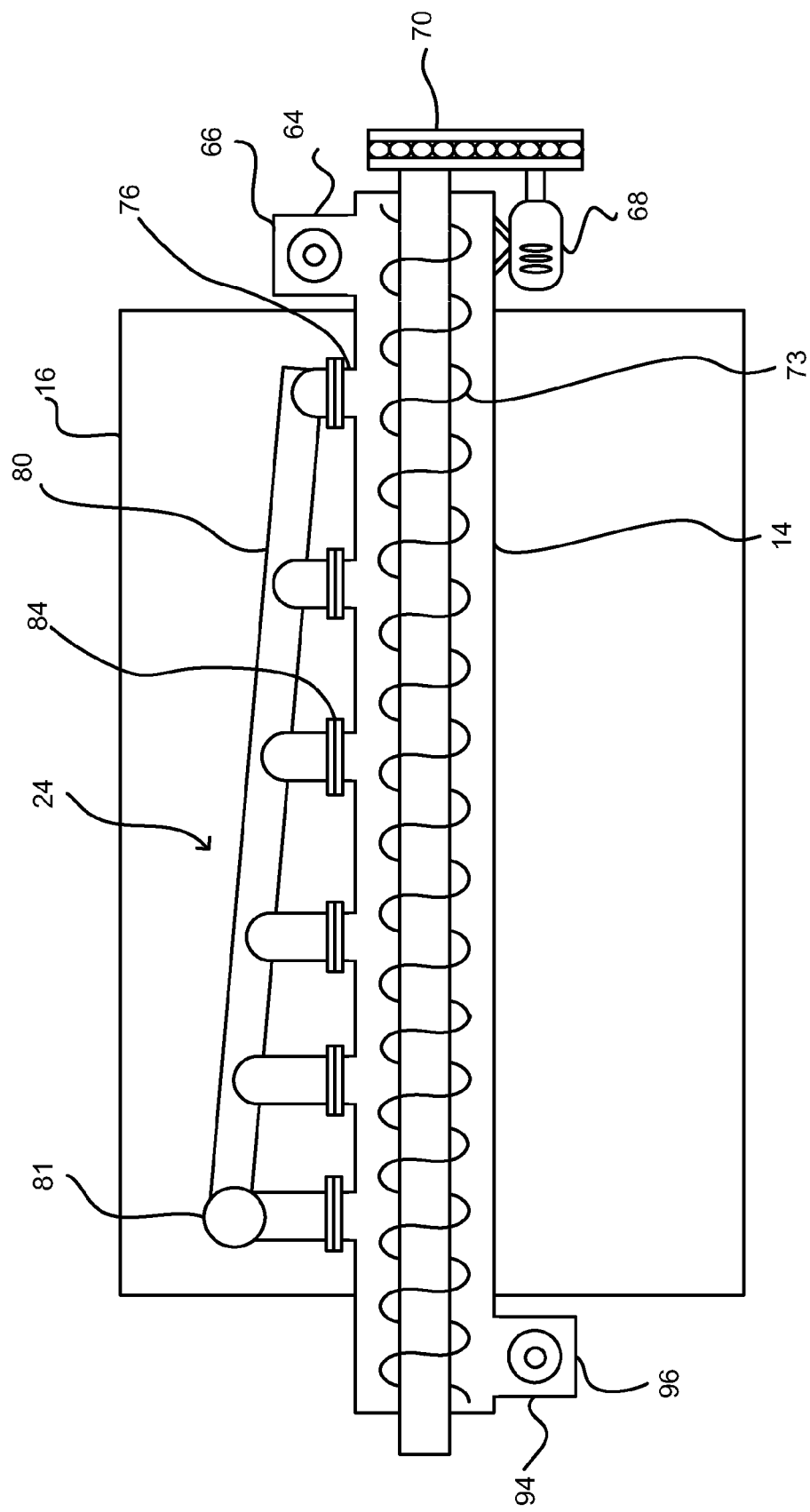
FIG. 5 is a cutaway side view of the furnace of the charcoal reactor system of FIG. 1.
Figure 6:
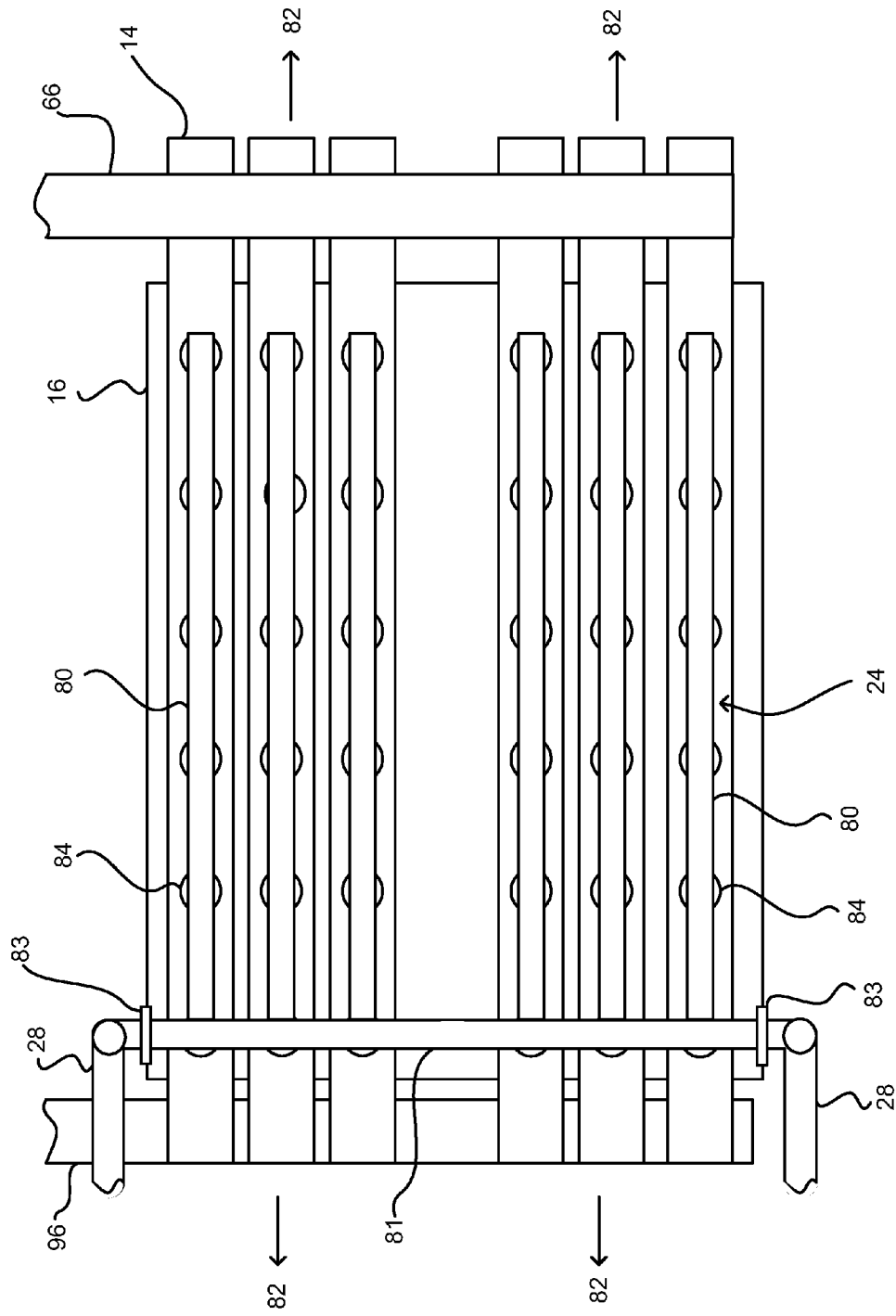
FIG. 6 is a cutaway top view of the furnace of the charcoal reactor system of FIG. 1.

Charcoal at the downstream end of retorts 14 is collected and delivered by delivery assembly 20 to storage bin 22. Biogas is vented from retorts 14 into manifold 24, as shown in FIGS. 5 and 6. Manifold 24 collects and delivers biogas to condensation assembly 26. Condensation assembly 26 includes condenser 28 and collection tanks 30, 30' where undesirable moisture is condensed from the biogas to produce clean syngas. Syngas is then routed from collection tanks 30 via syngas collection lines 32 for storage in syngas tank 34. Syngas stored in syngas tank 34 may for example be routed via syngas distribution lines 36 to furnace 16 and boiler 38 for use as fuel. Boiler 38 may be used to drive a turbine, for example (not shown).

Feed assembly 12 is shown in greater detail in FIG. 3. Feed intake 48 receives organic feed from an external source (not shown) and directs it into cyclone 52. Centrifugal action within cyclone 52 causes the organic feed to revolve and be thrown against the cyclone wall, creating a downward swirl of organic feed that falls toward moisture sensor valve 58 which directs the organic feed either to dry feed bin 54 or to green feed bin 56. If the moisture content of the organic feed is below a threshold moisture level then moisture sensor valve 58 closes cyclone outlet 55 to green feed bin 56 and opens cyclone outlet 53 to dry feed bin 54 (as shown by moisture sensor valve 58 depicted in solid lines in FIG. 3). A preferred threshold moisture level is 10 to 15%. If the moisture content of the organic feed is above the threshold moisture level then moisture sensor valve 58 closes cyclone outlet 53 to dry feed bin 54 and opens cyclone outlet 55 to green feed bin 56 (as shown by moisture sensor valve 58 depicted in dashed lines in FIG. 3). Moisture sensor valve 58 could be provided in the form of a pivoting flap valve, for example.

Organic feed in green feed bin 56 is directed via outlet 57 to inlet 59 of dryer 62. Blower 60 powered by blower motor 61 blows the incoming organic feed from green feed bin 56 through dryer 62 for drying. The dried organic feed is then blown through dryer outlet 63 back into cyclone 52 via return inlet 65.

Organic feed in dry feed bin 54 is loaded on to feed auger 64 inside feed line 66. Feed auger 64 carries the organic feed through feed line 66 and unloads it by free fall into inlets 15 of retorts 14 positioned beneath feed line 66.

The upstream end of retort 14 is shown in greater detail in FIG. 4. Motor 68 drives the axial rotation of shaft 72 of retort auger 73 inside retort 14. Motor 68 may drive shaft 72 by a chain 70 and sprocket (not shown) arrangement. In alternative embodiments, motor 68 may, for example, drive shaft 72 by gears. Any other suitable drive means may be used. Motor 68 may be fixed to retort 14 by brackets 75. Motor 68 therefore moves together with retort 14 as the heat of furnace 16 causes retort 14 to expand in direction 74. Fixing motor 68 directly or indirectly to retort 14 avoids stress on and potential breakage of chain 70 (or dislocation of gears if a gear arrangement were used) that would otherwise result if, for example, motor 68 was fixed to the exterior of furnace 14 and did not move in unison with the expansion of retort 14 in direction 74. While motor 68 is shown in FIG. 4 as fixed to an upstream end of retort 14, in alternative embodiments motor 68 may be fixed to a downstream end of retort 14.

Manifold 24 is shown in FIG. 5 (side view) and FIG. 6 (top view). Manifold 24 is located above retorts 14 and includes, for each retort 14, exhaust gas vents 76 connected to an axial collection vent 80. Axial collection vents 80 connect at their downstream end to cross collection vent 81 which connects to condensers 28 outside either side of a downstream end of furnace 16. Exhaust gas vents 76 for each retort 14 are spaced apart across the axial length of retort 14 within furnace 16 to provide substantially complete discharge of biogas from retort 14. In the illustrated embodiment, six exhaust vents 76 are provided for each retort 14. Axial collection vents 80 are inclined in the upstream to downstream direction. This incline facilitates the flow of biogas with axial collection vents 80 towards cross collection vent 81. Knife gate valves 83 regulate the outflow of biogas from cross collection vent 81 into condensers 28.

Figure 7:
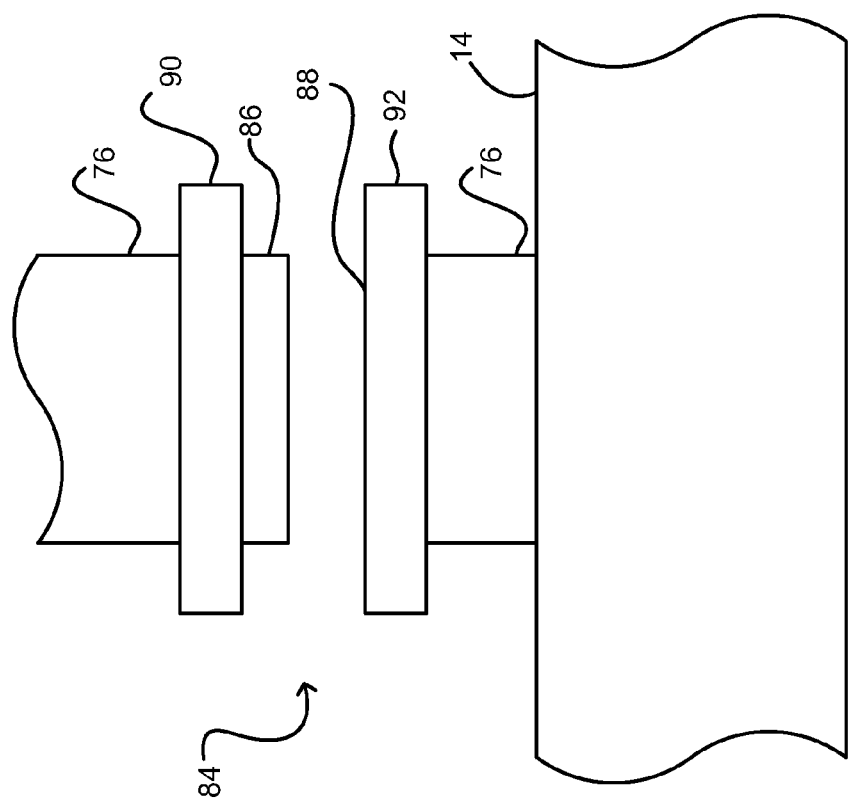
FIG. 7 is an exploded side view of an exhaust gas vent of the charcoal reactor system of FIG. 1.

Heat from furnace 16 causes retorts 14 and axial collection vents 80 to expand outwardly in direction 82 (FIG. 6). Because axial collection vents 80 and retorts 14 are axially aligned, stress fractures associated with gas manifolds of known systems wherein gas is collected in vents running transverse to the retorts is avoided. Any remaining strain at flanged connections 84 of exhaust gas vents 76 is addressed by providing a mating fit between two connecting components of exhaust gas vents 76 as illustrated in one embodiment in FIG. 7. Extension 86 of the top portion of exhaust gas vent 76 fits snugly within receiving end 88 of the bottom portion of exhaust gas vent 76. Top flange 90 and bottom flange 92 are then bolted together. The foregoing construction provides additional protection against potential biogas leakage. Extension 86 may extend downwardly ¼" from top flange 90. Top flange 90 and bottom flange 92 may be ½" thick each and be bolted by circumferentially spaced bolts (not shown). Gaskets (not shown) capable of withstanding temperatures of at least 600° C. may be provided between the outer perimeter of extension 86 and the inner perimeter of receiving end 88, and also between top flange 90 and bottom flange 92, to further prevent the possibility of leakage at flanged connections 84.

Figure 8:
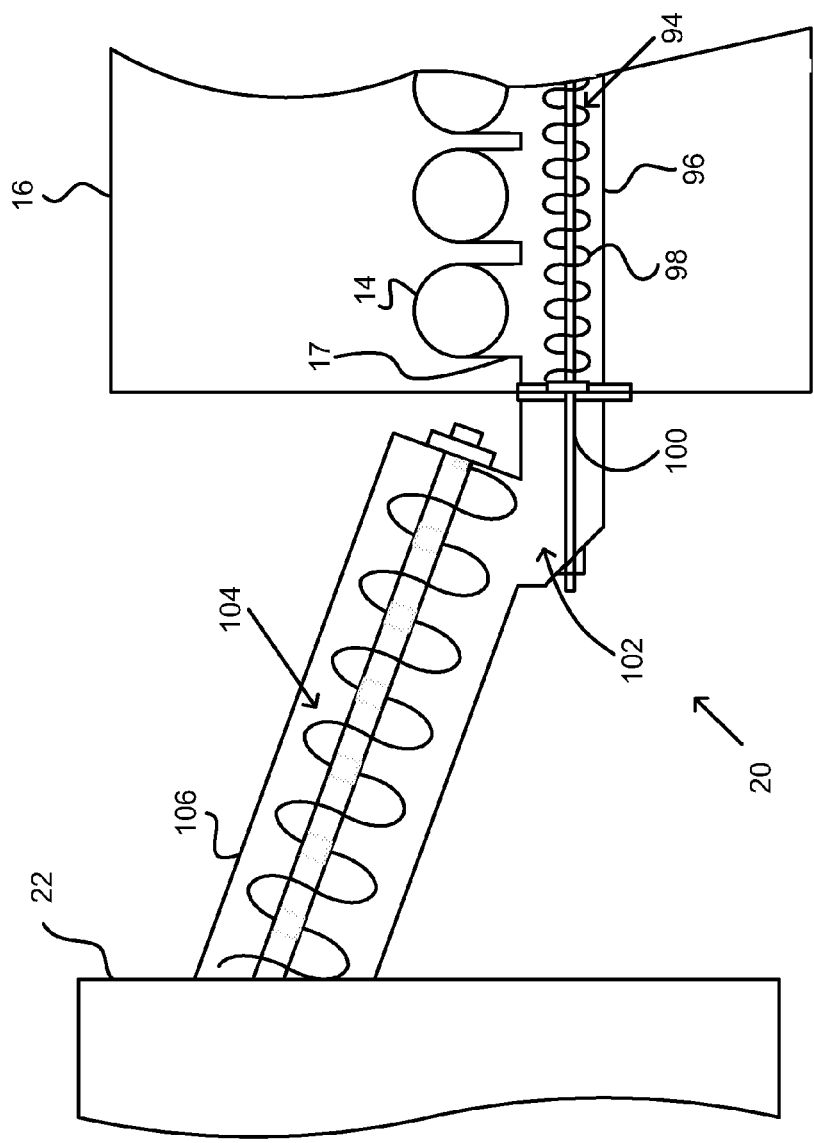
FIG. 8 is cutaway rear view of the delivery assembly of the charcoal reactor system of FIG. 1.

Delivery assembly 20 is shown in greater detail in FIG. 8. Free falling charcoal from outlets 17 of retorts 14 outside furnace 16 is collected by collection augur 94 extending through collection line 96. Collection auger 94 has flights 98 and a shaft 100. Flights 98 do not extend to the full downstream extent of shaft 100. Rather, a downstream flightless portion, i.e., transfer zone 102, is provided at the downstream end of collection line 96. In an alternative embodiment, collection auger 94 may not extend into transfer zone 102 at all. Transfer zone 102 allows charcoal collected by collection auger 94 to build up into a plug. This charcoal plug at transfer zone 102 prevents biogas from being carried by delivery assembly 20 into storage bin 22. Delivery augur 104 in delivery line 106 delivers charcoal from the plug at transfer zone 102 to storage bin 22. The rotation of delivery augur 104 may be faster than the rotation of collection auger 94 to prevent excessive buildup of the charcoal plug at transfer zone 102.

Figure 9:
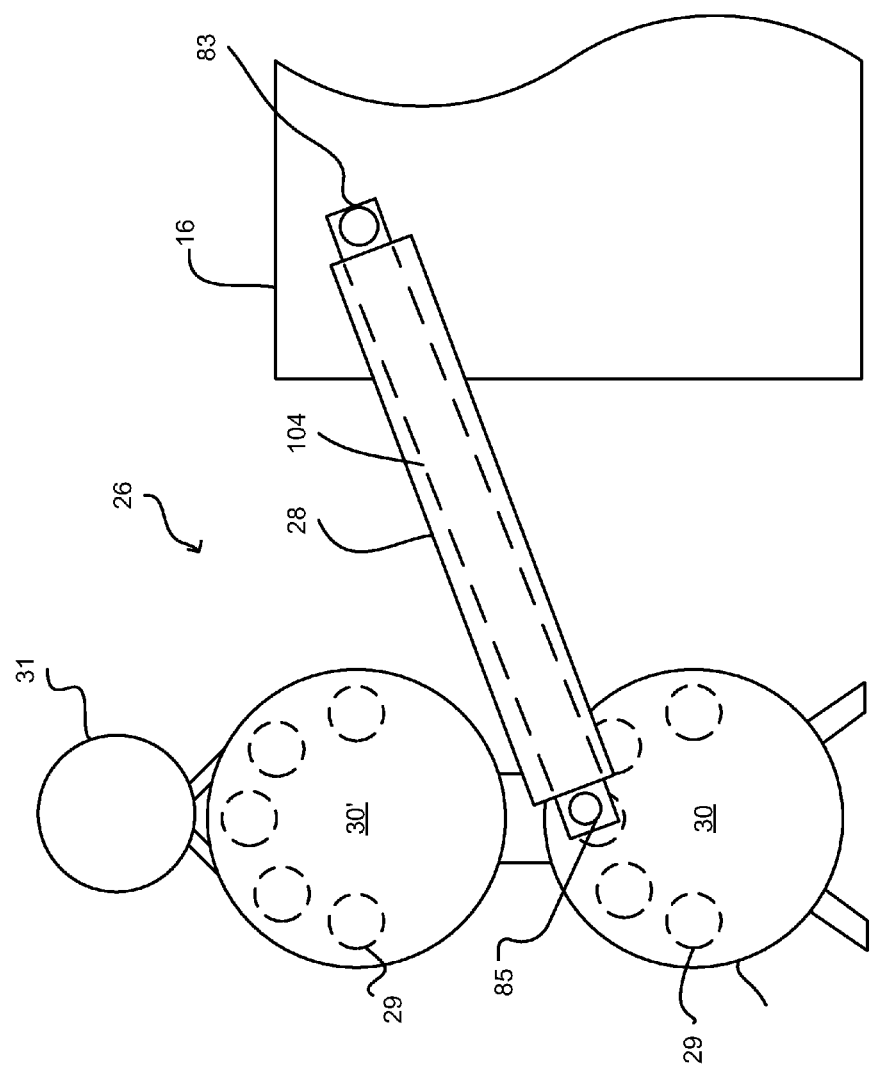
FIG. 9 is a side view of a condensation assembly of the charcoal reactor system of FIG. 1.

Condensation assembly 26 is shown in greater detail in FIG. 9. Condensation assembly 26 condenses biogas to produce syngas and bio oil. Condensation assembly 26 includes condensers 28, collection tanks 30, 30', and vacuum pump 31. Biogas from cross collection vent 81 of manifold 24 is routed through knife gate valves 83 to a pair of condensers 28 (in other embodiments one or more than two condensers may be provided). Knife gate valves 83 regulate flow of biogas into condensers 28. Each condenser 28 is provided with a cold water cooled jacket 104 to condense moisture from the biogas. Condenser 28 may be 12" in diameter. Knife gate valves 85 regulate flow of biogas from condensers 28 into serially arranged condenser tanks 30, 30'. Knife gate valves 83, 85 may be 6" in diameter. Further condensation of the biogas is achieved in the condenser tanks 30, 30' through (i) cold water-filled cooling pipes 29, extending horizontally within the tanks 30, 30', which scrub the biogas by cooling and (ii) vacuum pump 31 connected to and providing negative pressure within condensation tanks 30, 30'. Condensation tanks 30, 30' are connected to syngas tank 34 by syngas collection lines 32. Syngas distribution lines 36 connect syngas tank 34 to furnace 16 and boiler 38.

In operation, organic feed is fed through feed intake 48 into cyclone 52. "Green" feed having a moisture content above a threshold level is directed by moisture sensor valve 58 through a first cyclone outlet 53 into green feed bin 56. Feed in green feed bin 56 is blown into dryer 62 by blower 60 and dried. Dried feed is returned to cyclone 52 at return inlet 65 and, assuming the moisture content of the feed is now at or below the threshold level, is directed by moisture sensor valve 58 to dry feed bin 54. The dried feed is loaded onto feed auger 64 inside feed line 66. Rotation of feed auger 64 delivers the feed to inlets 15 of retorts 14 where the feed is loaded on to retort augers 73. Rotation of retort augers 73 advances the feed through retorts 14. The anaerobic conditions within retorts 14 and the heat from furnace 16 converts the feed in retort augers 73 to charcoal and biogas.

Biogas produced in retorts 14 is vented through exhaust gas vents 76, axial collections vent 80 and cross collection 81 to condensers 28. Knife gate valves 83 regulate the flow of biogas from cross collection vent 81 into condensers 28. Moisture from the biogas is partially condensed in condensers 28. Knife gate valves 83 may be operated such that only one is open at a time so that one of the condensers 28 is used and the other one of the condensers 28 is cleaned, allowing for continual operation of reactor 10. Continual operation of reactor 10 is useful, for example, when a power turbine (not shown) is coupled to reactor 10. Knife gate valves 85 regulate the flow of partially condensed biogas from condensers 28 into collection tanks 30,30' where further moisture is condensed from the biogas by cold water-filled cooling pipes 29 and negative pressure created by vacuum pump 31. "Dry" biogas, or syngas, is the delivered to syngas tank 34 and then on to furnace 16 and boiler 38 for use as fuel.

Charcoal produced in retorts 14 free falls from retort outlets 17 into collection augur 94 of collection line 96. Charcoal is advanced by collection auger 94 to a transfer zone 102 where a charcoal plug forms. Any biogas collected by collection auger 84 is physically blocked from flowing past the transfer zone 102 by the charcoal plug. Delivery auger 104 of delivery line 106 continually delivers charcoal from the downstream end of the plug to storage bin 22. Charcoal at the upstream end of the charcoal plug is continually replaced by charcoal delivered to it by collection auger 94.

Figure 10:
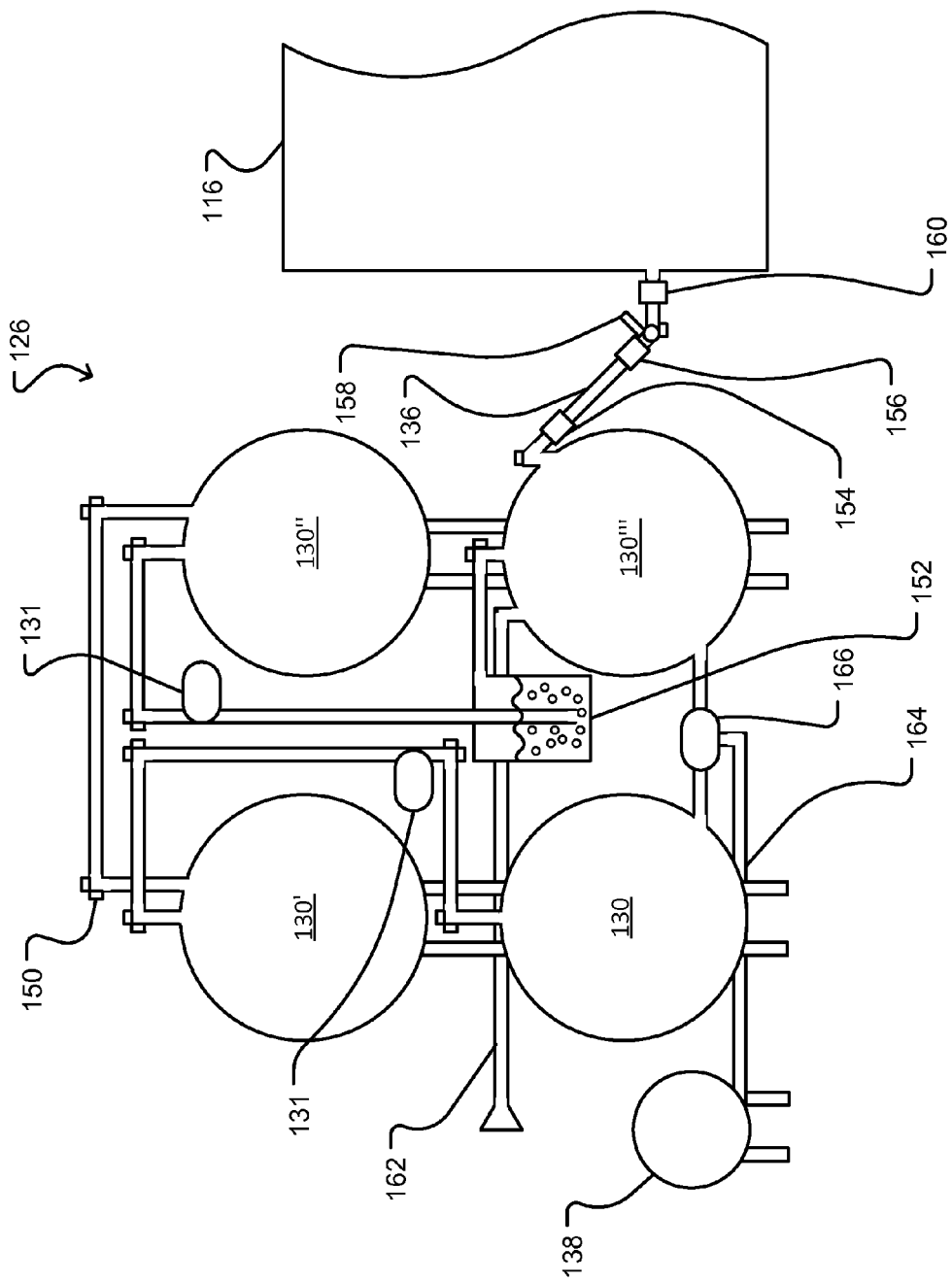
FIG. 10 is a side view of a condensation assembly of a charcoal reactor according to another embodiment of the invention.

An alternative embodiment of the condensation assembly is shown in FIG. 10. In condensation assembly 126, partially condensed biogas from condensers (not shown) are channelled to serially configured collection tanks 130, 130', 130", and 130'". Most of the bio oil condenses in collection tank 130. Trace bio oil may condense in collection tank 130'. Collection tank 130" and 130'" contain mostly syngas and very little if any bio oil remains to be condensed. As with collection tanks 30, 30', the interiors of collection tanks 130, 130', 130", and 130'" may be provided with cooling water pipes (not shown). Each corner of the lines running between the collection tanks may be provided with tar cleanout plugs 150 to facilitate cleaning. The lines may be 3" in diameter. As with condensation assembly 26, condensation assembly 126 is provided with vacuum pumps 131. A chilled water tank filter 152 is provided between collection tanks 130" and 130'" for further cleaning of the syngas. Chilled water tank filter 152 is preferably as large as possible, and may for example be 13" wide, 3' long, and 2.5' deep. A household freezer type cooling system or similar system may be used for cooling and a toilet type tank filler or similar filler may be used to replenish evaporated water, for example. Syngas distribution line 136 supplies syngas from condensation tank 130'" to furnace 116 as fuel. Syngas may also be stored in a syngas storage tank (not shown). Syngas distribution line 136 may include a manual or automatic fuel shutoff 154, flashback stopper 156 activatable by an infrared heat sensor 158 (or other heat sensitive sensor), and a syngas valve control 160. An upstream portion of syngas distribution line 136 may be provided with a tank pressure gauge (not shown) with a remote readout to allow remote fuel shutoff. Syngas distribution line 136 may include a syngas management manifold that distributes the line into a plurality of parallel syngas lines to furnace 116. The manifold may be 5" in diameter, and the individual syngas lines may be 2" in diameter to minimize tar build-up, for example. Four or six individual syngas lines may be provided, for example. Condensation tank 130''' is also provided with a flare stack 162. Bio oil from the condensation tanks is collected by bio oil collection line 164 connected to a vacuum pump 166 and leading to bio oil storage tank 138.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

I claim:

1. A reactor system for converting organic feed to charcoal, the system comprising:
    (a) a furnace;
    (b) a retort extending through the furnace, the retort comprising a retort auger, an inlet and an outlet;
    (c) a charcoal delivery assembly comprising:
        (i) a collection line adjacent to the outlet of the retort for receiving charcoal from the retort, the collection line comprising:
            a collection auger extending at least partially therethrough, the collection auger comprising a flighted portion; and
            a downstream end comprising a transfer zone,
        (ii) a delivery line connected to the collection line at a downstream portion of the collection line, the delivery line comprising a flighted delivery auger extending therethrough;
        wherein the transfer zone is defined by a space between the downstream end of the flighted portion of the collection auger and an upstream end of the flighted delivery auger; and
        wherein charcoal collected and delivered by the collection auger forms a plug at the transfer zone for blocking biogas from the retort from entering the delivery line.

2. The system of claim 1 comprising a feed assembly comprising:
    (a) a cyclone having a feed intake, a return inlet, and first and second outlets;
    (b) a first bin connected to the first outlet;
    (c) a feed line comprising an upstream portion connected to the first bin and a downstream portion connected to the inlet of the retort;
    (d) a second bin connected to the second outlet, the second bin having a bin outlet;
    (e) a dryer comprising:
        (i) a dryer inlet connected to the bin outlet of the second bin; and
        (ii) a dryer outlet connected to the return inlet of the cyclone,
    wherein the cyclone further comprises a moisture sensor valve configurable between a first position when moisture content of incoming organic feed is below a predetermined threshold and a second position when the moisture content is at or above a predetermined threshold, wherein in the first position the moisture sensor valve directs the organic feed into the first bin through the first outlet, and in the second position the moisture valve directs the organic feed into the second bin through the second outlet.

3. The system of claim 2 comprising a manifold in fluid communication with the retort, the manifold comprising:
    (a) one or more first gas vents for venting gas from the retort; and
    (b) a second gas vent in fluid communication with the one or more first gas vents, the second gas vent in axial alignment with the retort;
    wherein the second gas vent inclines in relation to the retort from a lower upstream position to a higher downstream position.

4. The system of claim 3, wherein the one or more first gas vents comprise a flanged connection having a top component with a top flange and a bottom component with a bottom flange, the top component having a downwardly projecting extension receivable by the bottom component.

5. The system of claim 4 comprising a condensation assembly in fluid communication with the manifold, the condensation assembly comprising:
    (a) a condenser in fluid communication with the manifold; and
    (b) one or more collection tanks in fluid communication with the condenser.

6. The system of claim 5, wherein the one or more collection tanks house a plurality of cooling pipes.

7. The system of claim 6, wherein the condensation assembly comprises a chilled water filter tank in flow communication between at least two collection tanks.

8. The system of claim 1 comprising a motor for driving rotation of the retort auger, wherein the motor is fixed to the retort.

9. The system of claim 1, wherein the furnace comprises an exhaust stack at an upstream end of the furnace.

10. A system for collecting charcoal from a retort, the system comprising:
    (a) a collection line adjacent to an outlet of the retort for receiving charcoal from the retort, the collection line comprising:
        a collection auger extending at least partially therethrough, the collection auger comprising a flighted portion; and
        a downstream end comprising a transfer zone,
    (b) a delivery line connected to the collection line at a downstream portion of the collection line, the delivery line comprising a flighted delivery auger extending therethrough;
    wherein the transfer zone is defined by a space between the downstream end of the flighted portion of the collection auger and an upstream end of the flighted delivery auger; and
    wherein charcoal collected and delivered by the collection auger forms a plug at the transfer zone for blocking biogas from the retort from entering the delivery line.

\* \* \* \* \*